United States Patent [19]

Baba et al.

[11] 4,009,738
[45] Mar. 1, 1977

[54] APPARATUS FOR CUTTING AN INSULATED WIRE, STRIPPING THE END THEREOF AND TWISTING THE WIRE STRANDS

[75] Inventors: Tsutomu Baba, Kawanishi; Shinpei Inukai, Takarazuka, both of Japan

[73] Assignee: Shin Meiwa Industry Co., Ltd., Nishinomiya, Japan

[22] Filed: Oct. 15, 1975

[21] Appl. No.: 622,639

[30] Foreign Application Priority Data

Oct. 25, 1974   Japan .............................. 49-123762

[52] U.S. Cl. .................................. 140/149; 81/9.51
[51] Int. Cl.[2] ........................ B21F 7/00; H02G 1/12
[58] Field of Search .............. 140/1, 149; 81/9.5 R, 81/9.5 A, 9.51; 30/90.1

[56] References Cited

UNITED STATES PATENTS

| | | | |
|---|---|---|---|
| 1,753,561 | 4/1930 | Emmert | 81/9.51 |
| 2,497,112 | 2/1950 | Andren | 81/9.51 |
| 3,527,124 | 9/1970 | Ullman | 81/9.51 |

*Primary Examiner*—Lowell A. Larson
*Attorney, Agent, or Firm*—W. G. Fasse; W. W. Roberts

[57] ABSTRACT

An apparatus for cutting an insulated wire, stripping the end thereof and twisting the wire strands, comprises an insulated wire intermittent supply, cutting blades to be driven to cut the wire during the stoppage of the wire supply and to be returned immediately thereafter. Front and rear stripping blades are driven to cut only the insulation of the wire at positions spaced forwardly and rearwardly of the wire cutting position. Front and rear insulation rotating bars are driven to contact the insulation forward and rearward of the wire cutting position and to move in the opposite directions to rotate the insulation thereof while the wire portions at the opposite sides of the wire cutting position are forcibly drawn in the directions away from the wire cutting position. Recesses of a suitable size are provided on the inner side surfaces of the wire cutting blades at a position slightly spaced from the edge thereof, and paired insulation stripping blades are adapted such that one member of each pair facing the recess of the wire cutting blade is retracted while the other is extended with respect to the wire cutting blades, whereby the end portions of the insulated wire, as cut, extend in the parallel direction and at displaced positions, while the cut ends of the wire face into the recesses of the cutting blades.

5 Claims, 8 Drawing Figures

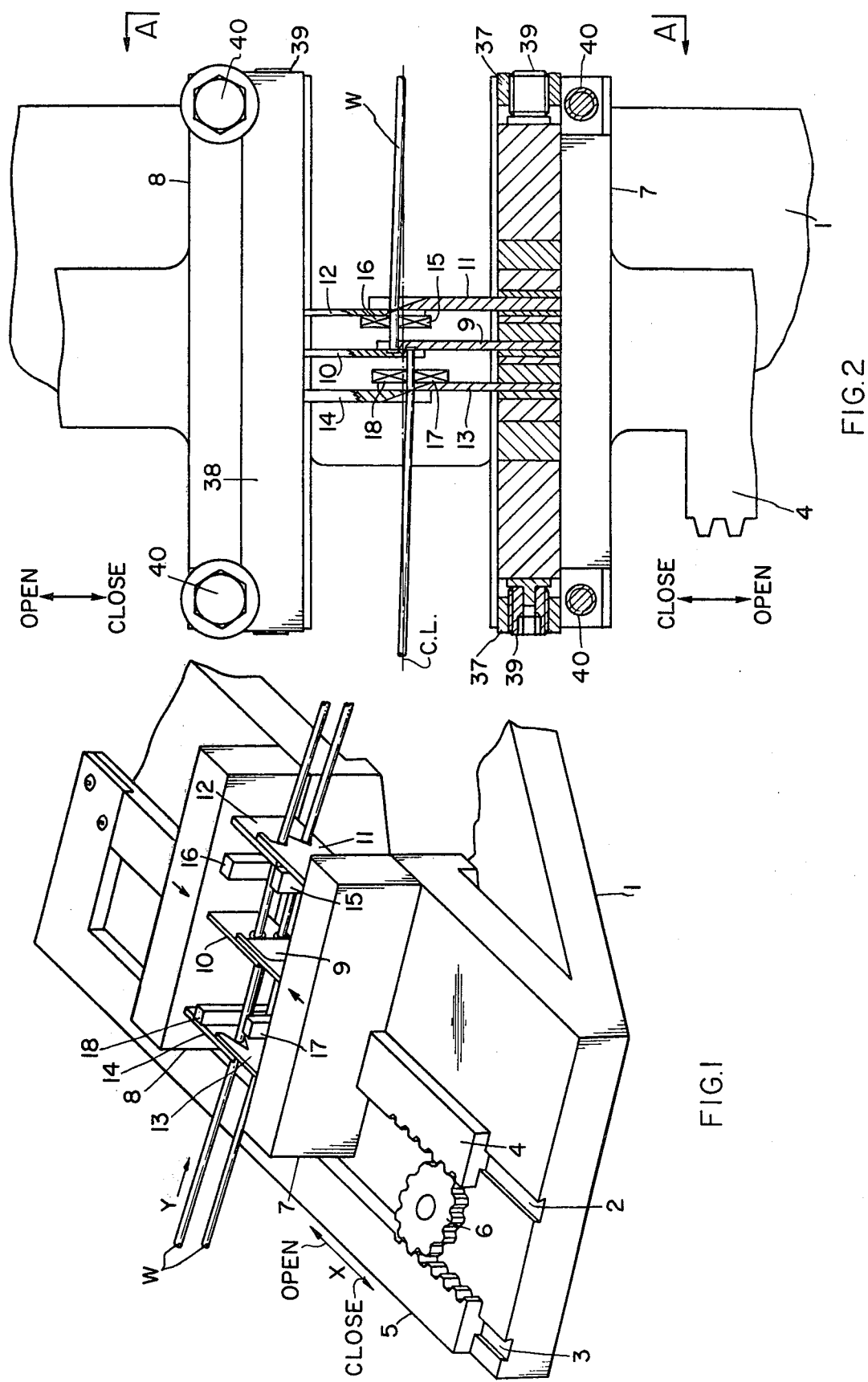

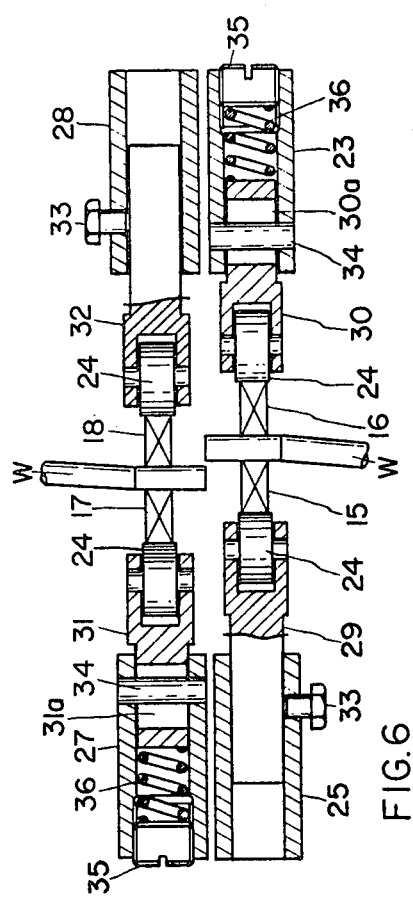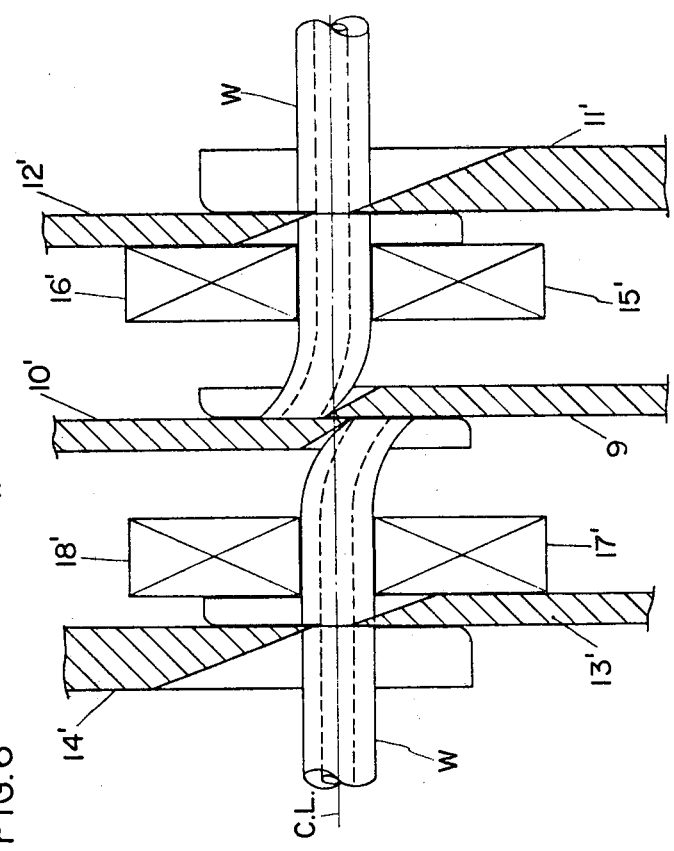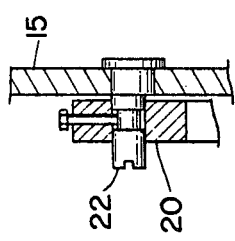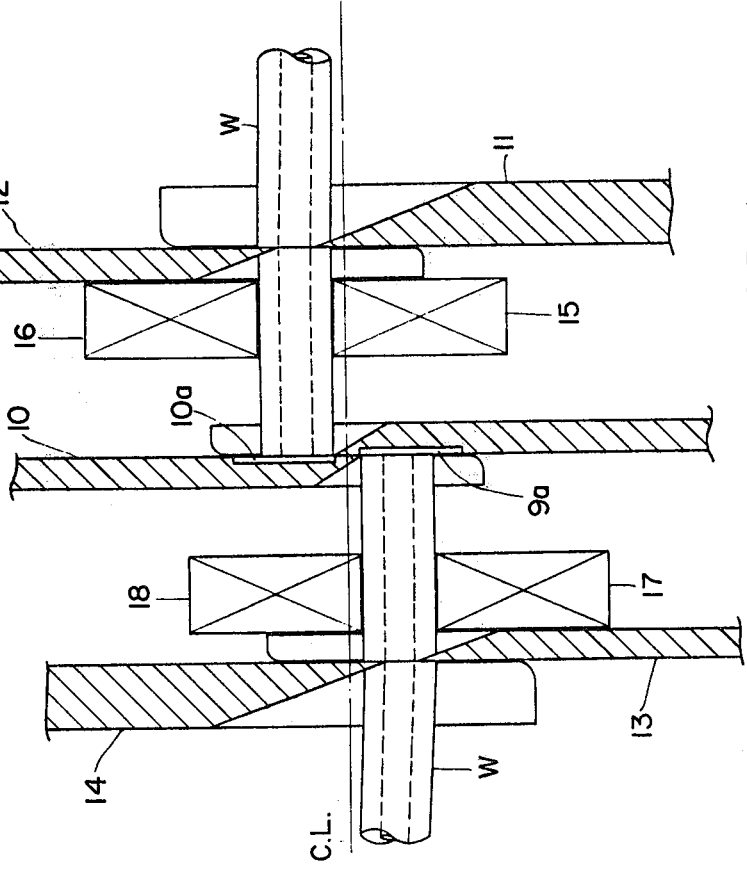

APPARATUS FOR CUTTING AN INSULATED WIRE, STRIPPING THE END THEREOF AND TWISTING THE WIRE STRANDS

BACKGROUND OF THE INVENTION

1. Field of the Invention

The present invention relates to an improvement in an apparatus for cutting an insulated wire, stripping the end thereof and twisting the wire strands.

2. Description of the Prior Art

Heretofore, there has been proposed an apparatus for cutting an insulated wire, stripping the end thereof and twisting the wire strand, in which pairs of insulation stripping blades are provided at the opposite sides of a pair of wire cutting blades, each pair of wire cutting blades and insulation stripping blades being adapted to effect cutting of the insulated wire and cutting of only the insulation at the opposite side portions of the cutting position on the insulated wire, respectively. The cutting is accomplished by the opening and closing movement of the opposed blades of pairs of cutting means. The insulation portions on opposite sides of the cutting position of the insulated wire are stripped by the drawing of the insulated wire in the back and forth direction imparted by clamp means for drawing the insulated wire. Pairs of insulation rotating bars are provided between the wire cutting blades and the insulation stripping blades. Each pair of the insulation rotating bars is adapted to hold therebetween the insulated wire in operative association with the closing movement of the blades, whereby the wire strands at the end portion of the cut insulated wire are twisted by rotation of the insulation being stripped by the opposite directional movement of the pair of insulation rotating bars in operative association with the drawing of the insulated wire by means of the clamp means. However, in such an apparatus, the tip ends of the wire, as cut, are forced by the wire cutting blades in the respective directions to be appreciably bent in the opposite directions, with the result that the wire end portions are held between the wire cutting blades and the insulation stripping blades while the wire end portions are compressed by the thickness of the wire cutting blades coming between the cut wires. Accordingly, rotation of the insulation in such a situation is subject to frequent slippage due to large frictional resistance, resulting in insufficient rotation of the insulation and thus an incovenience of incomplete twisting of the wire strands.

SUMMARY OF THE INVENTION

The present invention comprises an improvement in an apparatus for cutting an insulated wire, stripping the end thereof and twisting the wire strands, in which recesses of a suitable size are provided on the inner side surfaces of the wire cutting blades, paired insulation stripping blades are adapted such that one of each pair facing the recess of the wire cutting blade is retracted while the other is extended with respect to the wire cutting blades, whereby the end portions of the insulated wire, as cut, extend in the parallel direction at displaced positions, while the cut ends of the wire face into the recesses of the cutting blades.

Therefore, a principal object of the present invention is to facilitate twisting of the wire strands of the end portions of the cut insulated wire in an apparatus for cutting an insulated wire, stripping the end thereof and twisting the wire strands.

BRIEF DESCRIPTION OF THE DRAWINGS:

FIG. 1 is a perspective view of the present apparatus showing a relation between a mechanism for opening and closing the blades and insulation rotating bars, FIG. 2 is a plan view of the present apparatus showing a portion of the blades and the insulation rotating bars, FIG. 5 is an enlarged plan view of only the blades and the rotating bars in the closed state, FIG. 6 is a sectional view taken along the line B—B in FIG. 4, FIG. 7 is a sectional view taken along the line C—C in FIG. 4, and FIG. 8 shows the relationship between cutting blades and insulation rotating means in the closed condition in a machine of conventional construction to which the present insulation rotating means have been added.

Figure 4:
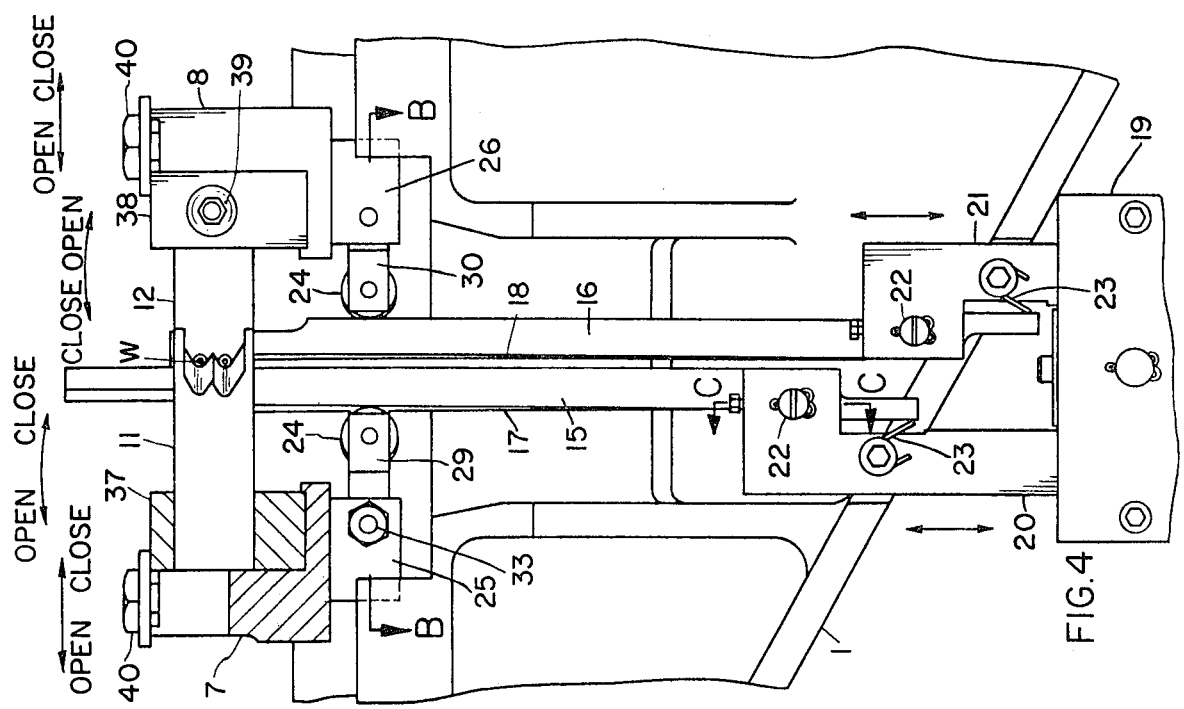
FIG. 4 is a view similar to that of FIG. 3 but showing the apparatus with the blades closed and the rotating bars.

A two-wire processing apparatus, according to the invention and as shown in the drawings will be described as an example. The apparatus shown comprises a blade bracket 1, which has grooves 2 and 3 formed in parallel on the top surface thereof for allowing slidable insertion therein of a general ractangle shaped rack 4 and a J-shaped rack 5, which are adapted to be engaged with a pinion 6 and have the respective ends thereof connected to a front slide 7 and a rear slide 8, respectively, so as to face each other. The slides 7 and 8 each comprise wire cutting blades 9 and 10, respectively, located so as to oppose each other at the central portion thereof and further comprising two pairs of insulation stripping blades 11 and 12, and 13 and 14 arranged so that the pairs are each positioned at the opposite sides of the pair of the wire cutting blades 9 and 10 so that the blades of a pair oppose each other.

Referring to FIG. 5, the wire cutting blades 9 and 10 have recesses 9a and 10a, respectively, formed at the position slightly spaced from the edge thereof on the respective opposing surfaces in suitable geometry and depth, while the insulating stripping blades 11, 12, 13 and 14 are positioned so that blades 13 and 12 facing the recesses 9a and 10a of the wire cutting blades 9 and 10 are retracted in the direction away from the axis or center line CL of the wire and the blades 11 and 14 of the other side with respect to the center line CL are extended in the direction toward the center line. Retraction and extension of the edge of the insulation stripping blades 11, 12, 13 and 14 are determined depending upon the diameter of the wire strands. More specifically, the blades 11 and 14 are extended with respect to the edge of the wire cutting blades 9 and 10, respectively, by a distance commensurate with the thickness of the insulation, whereas the blades 12 and 13 are retracted with respect to the edge of the wire cutting blades 10 and 9, respectively, by the distance commensurate with a sum of the length of the overlap between the edge portions of the wire cutting blades 9 and 10 in the closed position, the thickness of the insulation and the diameter of the wire strands.

Referring again to FIG. 1, the rear slide 8 is driven in the back and forth direction as shown by the arrow X by means of a suitable mechanism (not shown) engaged with a prime mover, while the front slide 7 is driven in the reverse back and forth direction by means of the pinion 6, so that both slides 7 and 8 make opening and closing movements.

The apparatus further comprises two pairs of insulation rotating bars 15 and 16, and 17 and 18, the lower ends of which are pivotaly coupled, by means of eccentric pins 22 to the upper ends of the paired racks 20 and 21, which are arranged in opposition and in combination with a pinion and rollers (not shown) within a box 19 mounted upright on a base, such that paired bars are normally urged in the opening direction by means of a return spring 23. The eccentric pins 22 adjust the position of the center of the pivotal movement of the insulation rotating bars so as to accomodate them to the diameter of the wire W to be held therebetween (refer to FIG. 7).

With particular reference to FIG. 6, rollers 24 are rotatably supported by means of pins at the end portion of the support bars 29, 30, 31 and 32, slidably mounted in cylindrical portions 25, 26, 27, and 28 fixed to the central lower portions of the front slide 7 and the rear slide 8 between the pairs of wire cutting blades 9 and 10, and the pairs of insulation stripping blades 11 and 12, and 13 and 14. The support bars 29 and 32 are adapted such that the extended length thereof is adjustable by means of a pusher bolt 33 and the support bars 30 and 31 are arranged so that the pins 34 fixed at the front end portion of the cylindrical portions 26 and 27 are inserted in the elongated apertures 30a and 31a formed at the rear portions of the support bars so as to allow movement of the support bars within the range of the elongated apertures with respect to the pins. Plugs 35 are threaded at the rear end portion of the cylindrical portions with the compression springs 36 interposed between the plugs and the rear ends of the support bars 30 and 31, whereby the rollers 24 are normally urged toward the center line CL.

Figure 3:
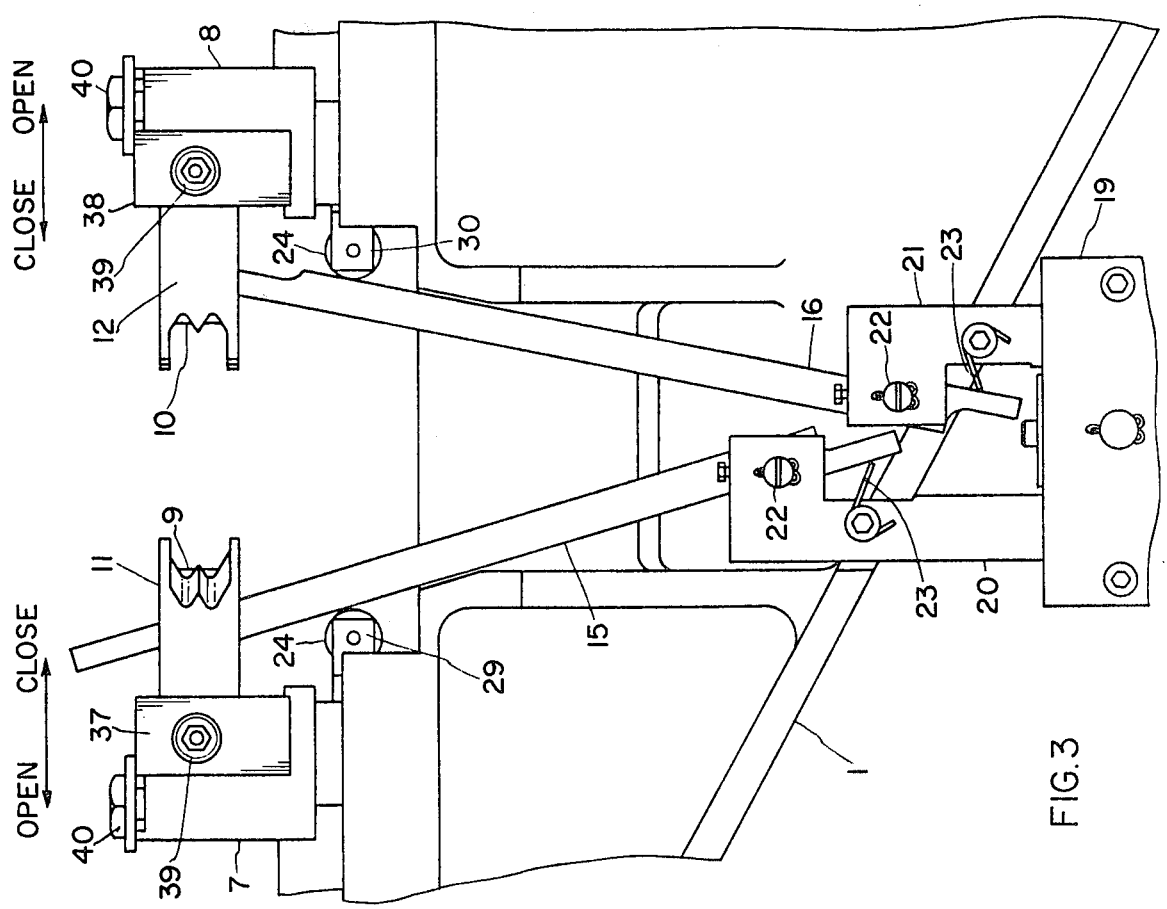
FIG. 3 is a side elevational view, as viewed in the direction of the arrow A in FIG. 2.

Accordingly, the insulation rotating bars 15 to 18 are opened by the return spring 23, as shown in FIG. 3, when the front slide 7 and the rear slide 8 are in an open state, whereas the bars are forced by the rollers 24 associated with the bars toward the central line as both slides 7 and 8 are closed to hold the wire W between the bars in the closed state, as shown in FIG. 4. The insulation rotating bars 15 and 16 are operatively associated with the drawing of the wire W in the withdrawing direction (the Y arrow direction in FIG. 1) by the clamp means. The insulation rotating bars 17 and 18 are operatively associated with the drawing of the wire W in the opposite direction by the clamp means, while a suitable mechanism coupled to a prime mover drives the respective racks 20 downwardly to impart the upward and downward opposite directional movements to the bars.

The positioning of the support bars 29 and 32 is adjusted in advance following the adjustment of the blades necessitated by changes of the diameter of the wire W, such that the insulation rotating bars 15 to 18 can hold the wire therebetween at the position of the cut wire W located away from the original center line CL.

The apparatus shown further comprises a front blade holder 37 and a rear blade holder 38, each fixed at the opposite side ends thereof to the front slide 7 and the rear slide 8, respectively, by bolts 40, for the purpose of facilitating adjustment of the interval between pairs of blades by the use of various spacers of different thicknesses and fixing to the blades by means of apertured bolts 39.

Now the operation of the apparatus according to the invention will be described. First, the wire W is drawn in the direction shown by the arrow Y in FIG. 1 from a stock reel by clamp means, not shown, in the open state of the front and rear slides 7 and 8, and then the rack 5 is driven in the closing direction, thereby to cause the closing movement of the front and rear slides 7 and 8, and thus the close movement of the wire cutting blades 9 and 10 and the insulation stripping blades 11 to 14, to cut the insulated wire W and cut only the insulation at the opposite side portions of the wire cutting position. While the front and rear slides 7 and 8 are moved as described previously, all the rollers 24 are moved toward the center line, thereby to urge the insulation rotating bars 15 and 16, and 17 and 18 so as to hold the wire W therebetween at the portions of the wire on opposite sides of the cut position. Accordingly, the cut end portions of the wire are located away from, and substantially in parallel to each other as shown in FIG. 5, while the cut end of the wire W are brought to face into the recesses 9a and 10a of the wire cutting blades without abutment against the surface of the wire cutting blades and thus in the free or less friction state.

Thereafter, the racks 20 are pulled downwardly by means of a suitable mechanism in synchronism with the drawing of the wire W in the withdrawing direction or the opposite direction by the clamp means, thereby to cause the upward and downward opposite directional movement of the insulation rotating bars 15, 16, and 17, 18. As a result, the insulations at the end portions of the wire are peeled off by the insulation stripping blades 11, 12. 13, 14 as the wire is drawn, whereby the end portion of the wire is stripped, while the insulation rotating bars 15 and 16, 17 and 18 rotate the insulation being peeled off thereby to impart the twisting to the wire strands at the end portion of the wire being stripped.

As described in detail in the foregoing, in the present apparatus, one of the pair of insulation stripping blades is extended and the other is retracted with respect to the wire cutting blades, so that the cut end portions of the wire are placed in parallel and dislocated from each other in the cut state, while the recesses are formed on the opposing surfaces of the wire cutting blades so as to receive the cut end of the wire, thereby to eliminate holding of the end portions of the wire, as cut, sandwiched between the wire cutting blades and the insulation stripping blades in a bent form causing resistance against rotation of the insulation being stripped, with the result that twisting of the wire strands by means of the insulation rotating bars can be effected smoothly and a perfect twisting operation is assured.

Although this invention has been described and illustrated in detail, it is to be clearly understood that the same is by way of illustration and example only and is not to be taken by way of limitation, the spirit and scope of this invention being limited only by the terms of the appended claims.

What is claimed is:

1. An apparatus for cutting an insulated wire, stripping the end thereof and twisting the wire strands, comprising;

means for intermittently supplying said insulated wire, wire cutting means adapted to be driven toward said supplied wire to cut the same at a predetermined position during the stoppage of supplying operation of said wire supplying means, front and rear insulation cutting means adapted to be driven toward said wire to cut substantially only the insulation of said wire at positions spaced apart from said predetermined cutting position of said wire cutting means, said front and rear insulation cutting means being located away from each other with respect to the axis of said supplied wire, whereby the end portions of the wire at the opposite sides of said wire cutting means are placed in spaced relation with each other, when said wire cutting means and said front and rear insulation cutting means have been driven toward said supplied wire, said wire cutting means having recesses formed on the surfaces thereof at the area around the position where the tip ends of said wire at the opposite sides of said wire cutting means abut against said surfaces of said wire cutting means, when said wire cutting means and said front and rear insulation cutting means have been driven toward said supplied wire, front and rear insulation rotating means adapted to be driven during the stoppage of the supplying operation of said wire supplying means, said front insulation rotating means being located between said front insulation cutting means and said wire cutting means, said rear insulation rotating means being located between said rear insulation cutting means and said wire cutting means for rotating the insulation of said end portions of the cut wire at the opposite sides of said wire cutting means about the axis of said wire, means for drawing said wires disposed forwardly and rearwardly of said wire cutting means in the directions away from said wire cutting means while said insulation rotating means are rotating the insulation of said end portions of the cut wire at the opposite sides of said cutting means, whereby the insulation of said end portions of the wire at the opposite sides of said wire cutting means is stripped from said wire, while the portion of the wire strands stripped of the insulation is twisted by the rotation of said portions of insulation being stripped, with the tips ends of the wire facing said recesses of said wire cutting means.

2. An apparatus as set forth in claim 1, wherein said wire cutting means comprises:
  a pair of slide members adapted to be driven toward and away from said wire, and
  a pair of blades mounted on said slide members opposed relations to each other and to said wire.

3. An apparatus as set forth in claim 1, wherein said insulation cutting means comprise;
  a pair of slide members adapted to be driven toward and away from said wire, and
  a pair of front blades and a pair of rear blades, mounted on said slide members in opposed relation to each other and to said wire.

4. An apparatus as set forth in claim 1, wherein each of said front and rear insulation rotating means includes a pair of parallel bar members adapted to be brought into contact with said supplied wire on opposite sides thereof and then moved in opposite directions to impart rotation to said insulation.

5. An apparatus as set forth in claim 4, wherein each of said front and rear insulation rotating means includes;
  means for driving one of said bar members in one direction, and
  means for converting the motion driving said one bar member in said one direction into an oppositely directed motion and imparting the latter to the other bar member.

* * * * *